July 24, 1951  W. F. SANDS  2,561,537
WIDE RANGE PERMEABILITY SYSTEM
Filed Aug. 14, 1946  5 Sheets-Sheet 1

INVENTOR
*William F. Sands*
BY
ATTORNEY

July 24, 1951 W. F. SANDS 2,561,537
WIDE RANGE PERMEABILITY SYSTEM
Filed Aug. 14, 1946 5 Sheets-Sheet 4

INVENTOR
*William F. Sands*
BY
ATTORNEY

July 24, 1951 W. F. SANDS 2,561,537
WIDE RANGE PERMEABILITY SYSTEM
Filed Aug. 14, 1946 5 Sheets-Sheet 5

INVENTOR
William F. Sands
BY H. G. Grover
ATTORNEY

Patented July 24, 1951

2,561,537

UNITED STATES PATENT OFFICE 2,561,537

WIDE RANGE PERMEABILITY SYSTEM

William F. Sands, Haddonfield, N. J., assignor to Radio Corporation of America, a corporation of Delaware Application August 14, 1946, Serial No. 690,445

7 Claims. (Cl. 171—242)

My present invention relates generally to permeability tuning systems, and more particularly to the core and coil structures thereof whereby such systems operate more efficiently and are capable of being tuned over a comparatively wide frequency range as compared to presently known tuning systems.

It is one of the main objects of the invention to provide improved core and coil structures for permeability tuning systems which have extremely wide tuning ranges.

A further object is to provide permeability tuning core and coil structures in which the true permeability of the iron is more nearly realized than in permeability tuners of the prior art.

A further object of the invention is to provide a composite coil-and-core structure having a pair of coils which, in order to obtain an increase in the tuning range, are so disposed as to cause a large increase in the mutual inductance between them as the core or cores are progressively inserted into the coils.

A still further object of the invention is to provide a tuning coil-and-core assembly in which a considerable change in the self-capacitance of the assembly with adjustment of the tuning core is utilized to effect an increase in the tuning range.

With permeability tuning systems of the prior art, it is possible to obtain an inductance change of only about 10 to 1, or a frequency change of only about 3.16 to 1, if one may neglect for the moment the change in self-capacitance of the coil-and-core assembly as the core is progressively inserted into the coil. It has long been considered desirable to extend the tuning range of permeability tuners, but so far as I know this has not been accomplished in an efficient and satisfactory manner. It would definitely be advantageous to obtain this increased tuning range provided it were due entirely to a larger change in inductance as the core is inserted or to a larger change in inductance plus a considerable change in the self-capacitance of the coil.

A considerably larger change in the L/C ratio for permeability tuned circuits may be utilized, for example, to provide, with cores and coils of conventional size (about 1¼" long), a tuning range of at least 6 to 1. This is equivalent to a frequency coverage, for example, from 540 to 3240 kc. This increased change in the L/C ratio may be utilized also to reduce the length of conventional cores and coils and yet secure a tuning range of at least 3 to 1. When used in conjunction with other circuit elements, such as a loop antenna, and utilizing the full length of the cores and coils, this increased change in the L/C ratio may be utilized to provide improved electrical performance. The additional inductive circuit elements, however, will decrease the tuning range to about 3 to 1.

It is known by those skilled in the art that an increased tuning range may be secured by: (1) increasing the permeability of the core material; or (2) for a given permeability ($\mu$), by increasing the effective permeability ($\mu_e$) by using the magnetic material in a core structure having a considerably lower reluctance, i. e., improved utilization of the magnetic core; or (3) increasing the ratio of length ($l$) to diameter ($d$) of the cores and the coils. When the length of the cores and coils is many times the diameter (i. e., the ratio $l/d$ approaches infinity), then the structure behaves the same as though the core and coil were bent into a "torus," causing thereby substantially the full permeability of the core material to be realized.

Now, according to my present invention, method (2) above is combined with yet a further means of providing increased tuning range. I have determined that two coils and cores (or a common yoke type core) may be so constructed and arranged as to cause a large increase in the mutual inductance between them as the core structure is inserted in the coils. Thus, by the use of these combined effects it has been possible, in an experimental setup, to secure a change in L/C ratio of the order of 50 to 1. This is by no means the maximum possible, but merely represents a realizable embodiment.

A clearer understanding of the invention will be had from the following description, when considered in connection with the accompanying drawings, wherein:

Figs. 3 and 3a to 3c disclose a preferred embodiment of a dual coil-and-core assembly; Fig. 3a being a cross-section of the coil assembly taken on the line 3a—3a of Fig. 3.

Figure 1:
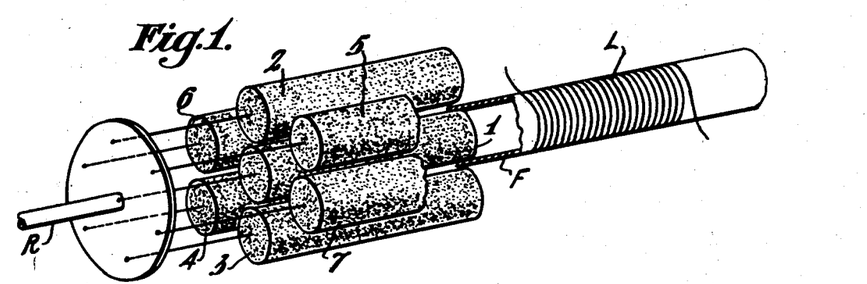
Fig. 1 is a permeability tuning system according to one embodiment of the invention.

In Fig. 1 there is disclosed an embodiment by which it was sought to secure an improved tuning range, by arranging additional movable cores around the outside of the coil the tuning of which by inductance variation it is desired to effect. The coil is designated L in the figure and is of the solenoid type wound on an insulated form F, and a core 1 is axially movable therein for varying its inductance. The additional cores, designated 2 to 7, are disposed around the center core 1, and are adapted to be moved in unison therewith by means of a common operating member R. In the Table I below are shown the tuning range $(f_1/f_2)$ and the percent increase in range for the various indicated combinations of cores over that of the center core 1 alone in conjunction with the coil L.

*Table I*

| Cores | 1 | 1, 2 | 1, 2 & 3 | 1, 2, 3 & 4 | 1, 2, 3, 4 & 5 | 1, 2, 3, 4, 5 & 6 | 1, 2, 3, 4, 5, 6 & 7 |
|---|---|---|---|---|---|---|---|
| $f_1/f_2$ | 3.22 | 3.33 | 3.44 | 3.52 | 3.58 | 3.63 | 3.672 |
| $\Delta(f_1/f_2)\%$ | 0 | 3.26 | 6.53 | 9.32 | 11.19 | 12.73 | 14.04 |

The coil L was a universal progressive winding, $1\tfrac{5}{32}$" long on a 0.220" outside diameter coil form, and the several cores were each 0.200" in diameter and $1\tfrac{3}{8}$" long. The ratios given in the table are for a change in core position from a fully entered position to a position where the cores are completely removed from the vicinity of the coil. It is seen that with the construction utilized in Fig. 1 only a slight increase in the tuning range is realized even when all six auxiliary cores are employed.

Figure 2:
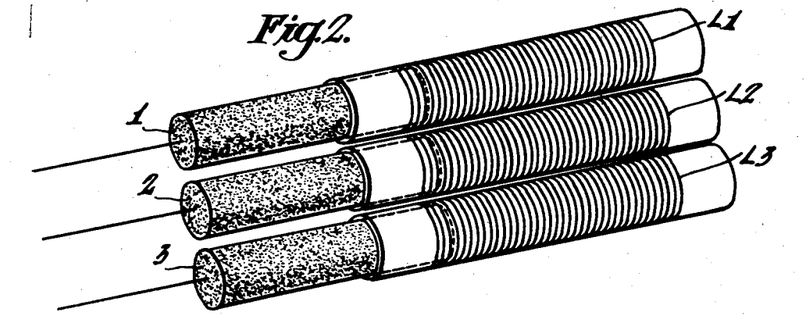
Fig. 2 is an embodiment of the invention utilizing a different coil-and-core arrangement.
Figure 2A:
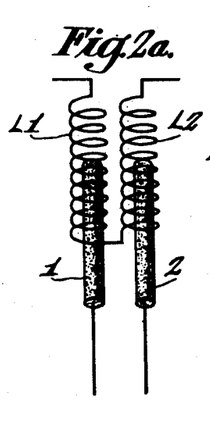
Figs. 2a to 2c show schematically arrangements of 2, 3, and 4 coil-and-core groups, respectively, utilizing the embodiment disclosed in Fig. 2.
Figure 2B:
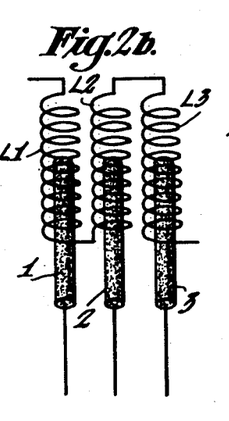
Figure 2C:
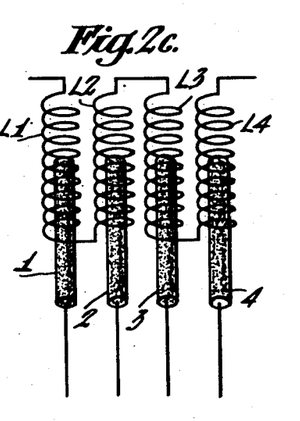

In Fig. 2 is shown the general arrangement of an embodiment which was next tried wherein a group of cylindrical coils L1 to L3 and their respective cores 1 to 3 are disposed in parallel, with their axes co-planar and with adjacent pairs of coils in tangential relation. In Figs. 2a to 2c are schematically shown arrangements of 2, 3, and 4 coil-and-core groups, respectively, utilizing the embodiment disclosed in Fig. 2. Table II below gives the tuning ranges for the 2, 3 and 4 coil-and-core groups (Figs. 2a, 2b and 2c, respectively), as compared with a single core and coil, as for example, 1 and L1.

*Table II*

| Number of Coil-and-Core groups | 1 | 2 | 3 | 4 |
|---|---|---|---|---|
| $f_1/f_2$ | 3.16 | 3.52 | 3.53 | 3.55 |
| $\Delta(f_1/f_2)\%$ | 0 | 11.39 | 11.71 | 12.34 |

It is seen that very little is to be gained by using more than two cores and coils. In each of the arrangements of Figs. 2, 2a, 2b and 2c, adjacent pairs of coils are contiguous along only a line parallel with the longitudinal axes. It is evident that with these arrangements the increase in mutual inductance, with insertion of the cores, will not be maximum.

Figures 3, 3A:
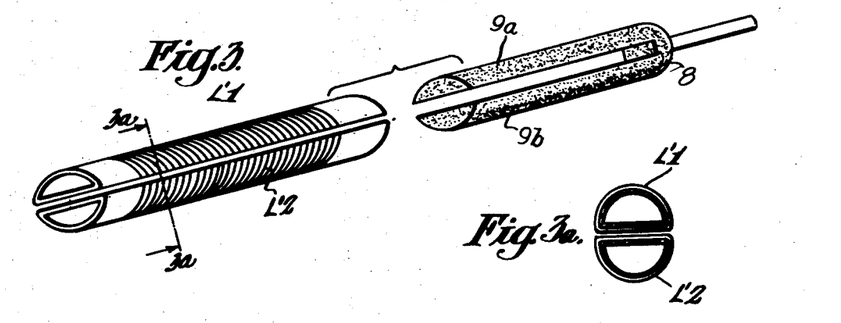
Figure 3B:
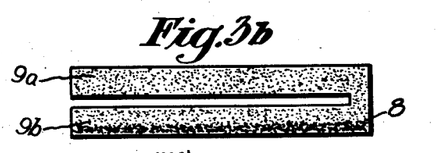
Fig. 3b being a front elevational view of the dual core.
Figure 3C:
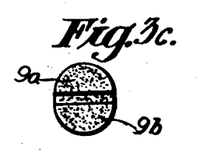
Fig. 3c being an end view of Fig. 3b.

In order to effect a considerably greater increase in mutual inductance with insertion of the cores, I next utilized the embodiment shown in Fig. 3 which makes use of two D-shaped or semi-circular coils $L'_1$ and $L'_2$ disposed in contiguous relation along their flat surfaces and a pair of similarly shaped cores 9a and 9b, joined at a pair of adjacent ends by a yoke 8. The flat surface of each coil was 38.9% of its entire perimeter. The coils were $1\tfrac{3}{8}$" long, close-wound solenoids of No. 32 enamel covered wire wound on a D-shaped coil form, the length of the flat portion of which was 0.260" and the radius of the semi-circular portion 0.138". As shown in Figs. 3b and 3c the core assembly comprises the two D-shaped cores 9a and 9b connected at one end by a yoke 8. In actual practice the core member may be formed by slotting a somewhat elliptically-shaped core along almost its entire length.

Figure 4:
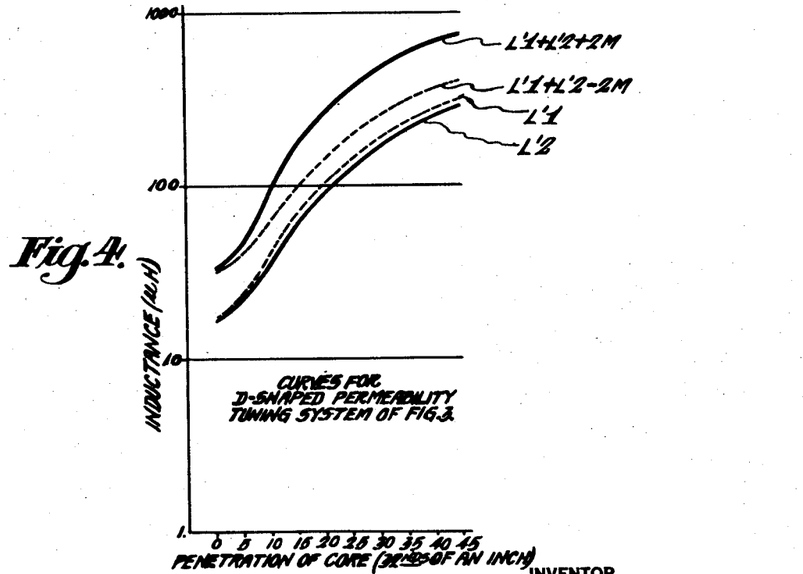
Figs. 4 to 6 are characteristic curves obtained as a result of actual measurements made on the coil-and-core assembly of Fig. 3.
Figure 5:
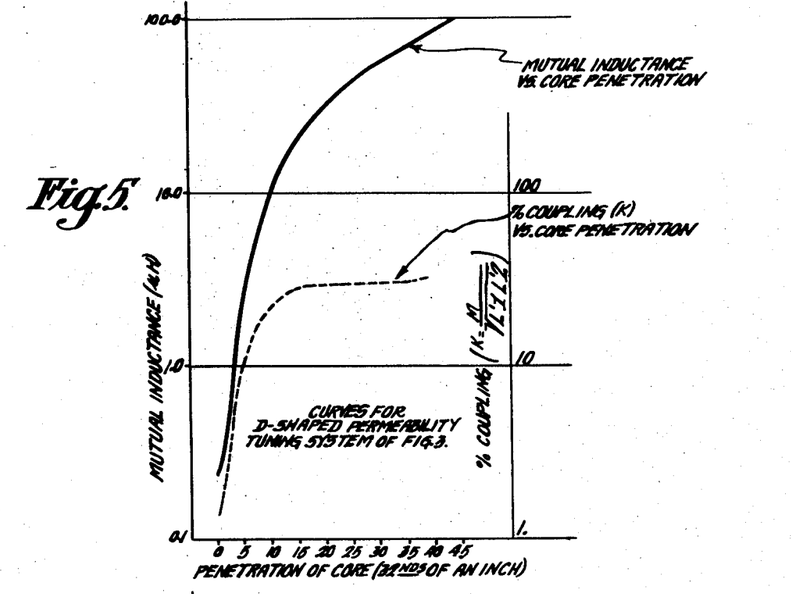

In Fig. 4 are plotted curves of the actual inductance vs. penetration of the core assembly for each of the two D-shaped coils individually ($L'_1$ and $L'_2$) and for the coils connected series-aiding $(L'_1+L'_2+2M)$ and series-bucking $(L'_1+L'_2-2M)$. In Fig. 5 are plotted curves of the mutual inductance and the coefficient of magnetic coupling vs. core penetration.

The inductance of the coil $L'_1$ is changed not only by the core 9a but by the entire assembly 9a, 9b and 8 which approximates a closed magnetic circuit. Thus, the measured inductance change of coil $L'_1$ is 18.8 to 1. Similarly, the coil $L'_2$ is affected by the entire assembly 9a, 9b and 8 with the result that the measured inductance change is 19.4 to 1. The slight difference in inductance change between $L'_1$ and $L'_2$ is unintentional, being due entirely to the small differences in the core elements, coil-forms, and denseness of the windings in making an initial laboratory sample assembly. The average tuning range of each coil, due to change in self-inductance alone, is 4.36 to 1. It will be noted therefore that a permeability tuned circuit consisting of only one of the coils $L'_1$, as shown in Fig. 3a, and the core assembly 9a, 9b and 8 (Figs. 3b and 3c) would in itself represent a considerable improvement in the art. However, a further increase in tuning range due to mutual inductance between the coils is obtainable and this will next be considered.

The total range of inductance change shown by the curve of $L'_1+L'_2-2M$ (i. e., series bucking connection) is 12.9 to 1, whereas the inductance range for the $L'_1+L_2+2M$ curve is 24.92 to 1. It is thus seen that the aiding connection is required in order to secure a large tuning range. Actually, an even larger tuning range could be secured by use of a parallel aiding connection (as will be shown later).

From the above curves it is possible to secure the variation in mutual inductance (i. e., M) vs. core penetration as has been shown in Fig. 5. The total range in M is from 0.235 μh. to 99.0 μh., i. e., a ratio of 421 to 1. The coefficient of coupling (k) was then calculated and is also shown in Fig. 5. It may be noted that K rises rapidly as the core assembly is first inserted in the coils and quickly reaches an almost constant value of 31%. From this, a further material increase in the tuning will result as shown by the measured overall range of 5.025 to 1.

Figure 6:
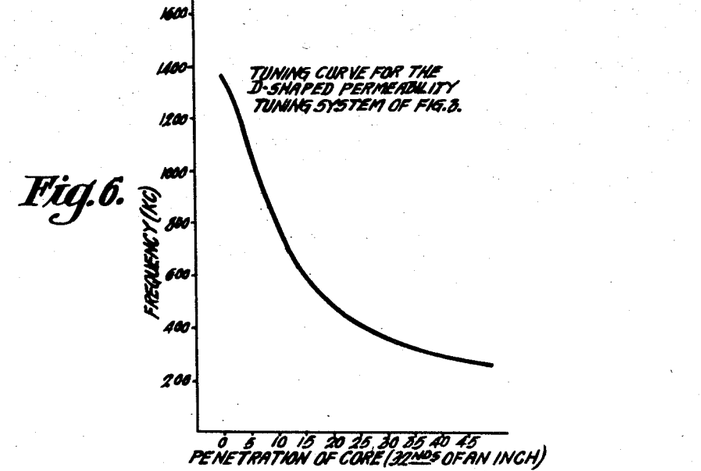

In Fig. 6 is plotted the tuning curve of the coil-and-core assembly shown in Fig. 3 when tuned with a capacitor of 450 μμf. The frequency range from a butting position of the core (i. e., zero penetration) to $45/32$ of an inch penetration (approximately $1\frac{3}{8}$") varied from 1370 kc. to 270 kc., which is slightly better than 5 to 1, the actual ratio being 5.025 to 1. When the material forming the yoke portion of the core was removed to provide two separate cores, the corresponding tuning range was found to be 4.80 to 1.

Inasmuch as 450 μμf. was used to tune the assembly, the increase in range due to the change in distributed capacity with penetration was slight. Thus, from Fig. 4, the range of $$L'_1 + L'_2 + 2M$$

for 0 to $45/32$ of an inch penetration is 24.92 to 1. The range in frequency due to an inductance change alone is $\sqrt{24.92}$ to 1, or 4.98 to 1, which is only slightly different from the measured frequency range of 5.025 to 1.

Figure 7:
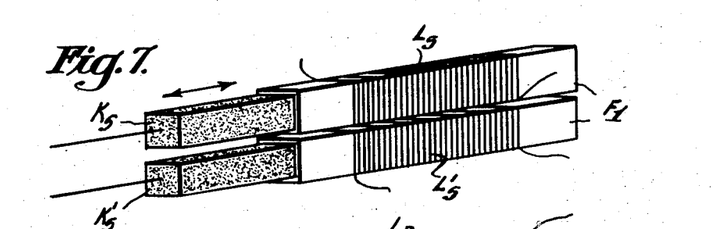
Figs. 7 to 9 are various coil-and-core combinations which were tested to determine the effect on the tuning range of the percent of each coil periphery which is contiguous to the other (for the two coils of the assembly)
Figure 8:
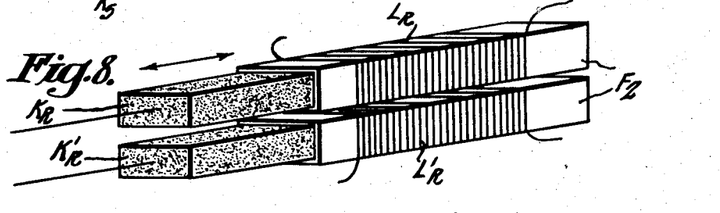
Figure 9:
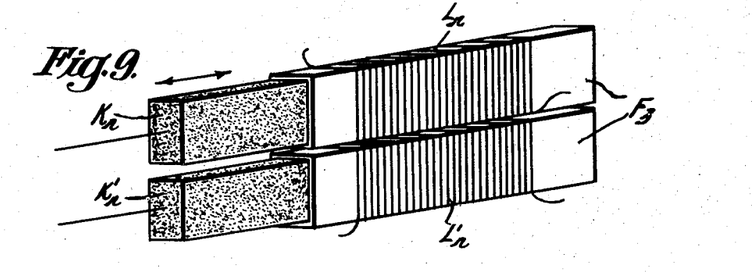

Although the tuning range for the coil-and-core assembly of Fig. 3 is quite remarkable, it was decided to make measurements upon a group of square and rectangular dual coil-and-core assemblies in order to check the influence of the percent of the coil perimeters which are contiguous. In Figs. 7, 8 and 9 are shown several dual coil-and-core assemblies on which measurements were made. In Fig. 7 the coils $L_S$, $L'_S$ and their respective cores $K_S$, $K'_S$ are square. In Fig. 8 the coils $L_R$, $L'_R$ and their respective cores $K_R$, $K'_R$ are rectangular with the longer sides of the coils in contact. In Fig. 9 the coils $L_r$, $L'_r$ and their respective cores $K_r$, $K'_r$ are also rectangular but with the shorter sides of the coils contiguous. The coil forms $F_1$, $F_2$ and $F_3$ were all thin-walled paper forms, wrapped on suitable mandrels and cemented together with ambroid. The coils were all single layer close-wound with No. 32 enamel covered wire and were $1\frac{1}{4}$" long. The individual cores were made 0.1505" by 0.1505" square and were $1\frac{1}{4}$" long. For the various shapes utilized in Figs. 7 to 9, two or more of the cores were stacked together in order to secure the desired core shape. Thus, the core shapes were 0.1505" by 0.1505"; 0.1505" by 0.301"; 0.1505" by 0.4515"; 0.1505" by 0.602", and 0.301" by 0.301".

The square coils of Fig. 7 may be those designed either for the 0.1505" by 0.1505" cores or the 0.301" by 0.301" cores. The rectangular coils of Fig. 8 may be those designed either for the 0.1505" by 0.301" cores, the 0.1505" by 0.4515" cores, or the 0.1505" by 0.602" cores, pressed together so that greater than 25% of the perimeter of each coil is in uniformly contiguous relation with the other. The rectangular coils of Fig. 9 may be those designed either for the 0.1505" by 0.301" cores, the 0.1505" by 0.4515" cores, or the 0.1505" by 0.602" cores, pressed together so that less than 25% of the perimeter of each coil is in intimate contact with the other. In the data of Table III below, $a$ represents the height of each core, and $b$ represents the width of each core, the core width corresponding to the sides of the coils which are in intimate contact.

Figure 10:
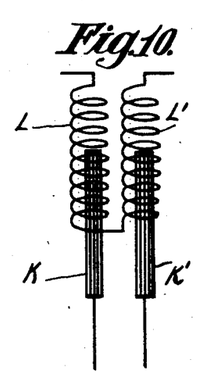
Figs. 10 to 13 show schematically the various electrical connections utilized for the coils of Figs. 7 to 9.

Figs. 10 to 13 show the various coil connections which were tried for each of the coil-and-core combinations shown in Figs. 7 to 9. Since the coil connections of each of the Figs. 10 to 13 are applicable to all the coil-and-core combinations of Figs. 7 to 9, the subscripts S, R and $r$ used in the latter figures to distinguish the various coils and cores have been omitted from Figs. 10 to 13. In Fig. 10 the coils are shown connected in series aiding; in Fig. 11 they are shown in parallel aiding; in Fig. 12 in parallel bucking; and in Fig. 13 in series bucking.

Table III

Figure 11:
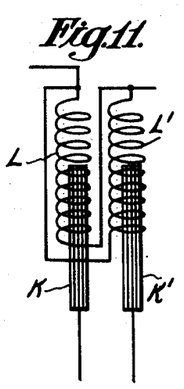

| Core Height $a$ | Core Width $b$ | Surface Contact of coils | $C_{\mu\mu f}$ | Tuning Range, Two Coils and Cores | |
|---|---|---|---|---|---|
| | | | | Fig. 10 | Fig. 11 |
| Inches .1505 (Fig. 7) | Inches .1505 | Per cent 25.0 | 27.0 30.0 50.0 75.0 120.0 200.0 320.0 460.0 | 5.59 5.52 5.50 5.48 5.48 5.50 5.44 5.37 | 6.21 6.10 5.91 5.78 5.62 5.48 5.49 5.49 |
| .1505 (Fig. 8) | .301 | 33.3 | 27.0 30.0 50.0 75.0 120.0 200.0 320.0 460.0 | 5.69 5.75 5.65 5.67 5.52 5.43 5.43 5.43 | 6.46 6.42 6.05 5.84 5.67 5.61 5.57 5.49 |
| .1505 (Fig. 8) | .4515 | 37.5 | 27.0 30.0 50.0 75.0 120.0 200.0 320.0 460.0 | 6.00 6.03 5.80 5.70 5.58 5.50 5.46 5.45 | 6.46 6.40 6.16 5.95 5.80 5.68 5.54 5.46 |
| .1505 (Fig. 8) | .602 | | 0.0 1.0 2.5 5.0 10.0 20.0 27.0 30.0 30.0 50.0 50.0 75.0 75.0 120.0 200.0 320.0 460.0 | ----- ----- ----- ----- ----- ----- 5.72 ----- 5.70 ----- 5.61 ----- 5.55 5.49 5.46 5.42 5.42 | *7.17 *7.15 *7.09 *7.03 *6.89 *6.76 6.69 *6.47 6.64 *6.23 6.33 *6.07 6.09 5.93 5.69 5.56 5.44 |
| .301 (Fig. 7) | .301 | 25.0 | 0.0 1.0 2.5 5.0 10.0 20.0 27.0 30.0 30.0 50.0 50.0 75.0 120.0 200.0 320.0 460.0 | ----- ----- ----- ----- ----- ----- 5.25 ----- 5.27 ----- 5.12 5.04 4.92 4.91 4.90 4.88 | *7.13 *7.12 *7.03 *6.88 *6.46 *6.12 5.98 *5.90 6.01 *5.59 5.68 5.47 5.31 5.21 5.03 4.90 |
| .301 (Fig. 9) | .1505 | 16.7 | 30.0 460.0 | 4.94 4.73 | 5.67 4.88 |
| .4515 (Fig. 9) | .1505 | 12.5 | 30.0 460.0 | 4.74 4.46 | 5.45 4.60 |
| .602 (Fig. 9) | .1505 | 10.0 | 30.0 460.0 | 4.47 4.21 | 5.20 4.25 |

The majority of the data was secured by direct measurement on a "Q" meter. However, the data preceded by* was secured by shunting the coil-and-core assembly under test across another tuned circuit on the "Q" meter, and the variable capacitor (Cμμf.) was retuned to restore resonance. By this indirect means, it was possible to tune the assembly with low values of capacity and in some cases with zero capacity to thereby operate at the self-resonant frequency of the assembly.

The coil connections of Figs. 10 and 11 were found to give the largest tuning range, particularly with the connections of Fig. 11. As further proof of this, Table IV below gives the tuning ranges utilizing a capacity of 30 μμf. and one of 460 μμf. and a core 0.1505" by 0.1505", for the coil connections of Figs. 10 to 13.

Table IV

Figure 12:
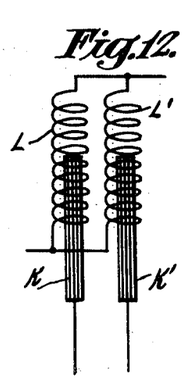
Figure 13:
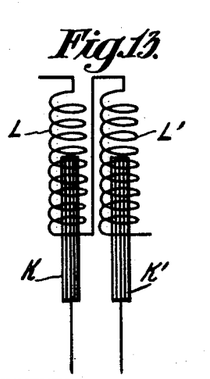

| Core Height a | Core Width b | Surface Contact of Coils | Cμμf. | Tuning Range, Two Coils and Cores | | | |
|---|---|---|---|---|---|---|---|
| | | | | Fig. 10 | Fig. 11 | Fig. 12 | Fig. 13 |
| Inches .1505 | Inches .1505 | Per cent 25.0 | 30.0 460.0 | 5.52 5.37 | 6.10 5.49 | 4.17 3.72 | 3.81 3.70 |

It is seen that the tuning ranges of Figs. 12 and 13 are considerably less than those of Figs. 10 and 11.

The self-capacitance ($C_d$) of the double coil-and-core assembly with core dimensions of $a=.1505''$ and $b=.602''$ (Fig. 9) and connected as in Fig. 10 was $C'_d= 32$ μμf. with the cores removed and $C''_d=38.5$ μμf. with the cores fully inserted in the coils. Therefore, in Table V below, the total tuning range R is given for various values of C (i. e., external circuit capacitance); the tuning range R', due to the change in $C_d$ alone, is also calculated for the various values of external circuit capacitance; and finally the tuning range R" due to change of inductance (both self-inductance of the individual coils, and the mutual inductance between them) is also given. It is seen that the average tuning range, due to inductance change alone, was 5.40 to 1. Due to the small change in self-capacitance, the total tuning range for a value of circuit capacitance as low as 27 μμf. is increased only to 5.72 to 1.

Table V

["$a$"=.1515''; "$b$"=.602''; connected as in Fig. 10.]

| Cμμf. | Tuning Range R | $\frac{C+C''_d}{C+C'_d}$ | $R'=\sqrt{\frac{C+C''_d}{C+C'_d}}$ | $R''=\frac{R}{R'}$ |
|---|---|---|---|---|
| 27 | 5.72 | 1.110 | 1.053 | 5.432 |
| 30 | 5.70 | 1.105 | 1.050 | 5.430 |
| 50 | 5.61 | 1.080 | 1.0393 | 5.402 |
| 75 | 5.55 | 1.0602 | 1.0295 | 5.396 |
| 120 | 5.49 | 1.0425 | 1.0205 | 5.397 |
| 200 | 5.46 | 1.0275 | 1.013 | 5.390 |
| 320 | 5.42 | 1.018 | 1.0085 | 5.378 |
| 460 | 5.42 | 1.013 | 1.0055 | 5.386 |

Average R"=5.40.

The same assembly was then connected as in Fig. 11. Values of R, R' and R" (for various values of C) are given in Table VI below, the self-capacitance of the assembly was 32.5 μμf. with the cores fully inserted in the coils ($C''_d$). It is seen that the average tuning range, due to inductance change alone, was 5.43 to 1. However, due to the large change in self-capacitance, the total tuning range, for small values of circuit capacitance, is greatly increased. For example, with $C=27$ μμf., the total range was 6.69 to 1. This very desirable improvement is due to the greater change in self-capacitance of the arrangement of Fig. 11, inasmuch as the average values of R" for both Tables V and VI are substantially the same.

Table VI

["$a$"=.1515''; "$b$"=.602''; connected as in Fig. 11.]

| Cμμf. | R | $\frac{C+C''_d}{C+C'_d}$ | $R'=\sqrt{\frac{C+C''_d}{C+C'_d}}$ | $R''=\frac{R}{R'}$ |
|---|---|---|---|---|
| *0.0 | 7.17 | 1.81 | 1.345 | 5.330 |
| *1.0 | 7.15 | 1.785 | 1.336 | 5.350 |
| *2.5 | 7.09 | 1.752 | 1.324 | 5.356 |
| **5.0 | 7.03 | 1.702 | 1.305 | 5.389 |
| *10.0 | 6.89 | 1.619 | 1.272 | 5.417 |
| 20.0 | 6.76 | 1.501 | 1.225 | 5.519 |
| 27.0 | 6.69 | 1.443 | 1.201 | 5.570 |
| *30.0 | 6.47 | 1.422 | 1.193 | 5.422 |
| 30.0 | 6.64 | 1.422 | 1.193 | 5.567 |
| *50.0 | 6.23 | 1.32 | 1.149 | 5.425 |
| 50.0 | 6.325 | 1.32 | 1.149 | 5.510 |
| 75.0 | 6.07 | 1.245 | 1.115 | 5.440 |
| *75.0 | 6.09 | 1.245 | 1.115 | 5.460 |
| 120.0 | 5.93 | 1.173 | 1.083 | 5.477 |
| 200.0 | 5.69 | 1.113 | 1.055 | 5.392 |
| 320.0 | 5.56 | 1.075 | 1.036 | 5.361 |
| 460.0 | 5.44 | 1.054 | 1.026 | 5.300 |

Average R"=5.43.

Figure 14:
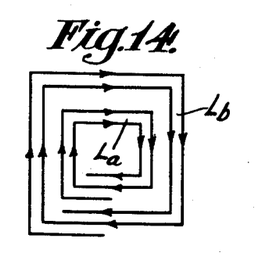
Figs. 14 and 15 are diagrams utilized to explain the effect of the connections of Figs. 10 to 13.
Figure 15:
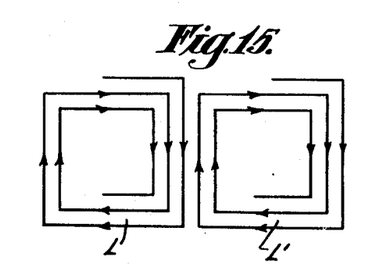

In order to correctly designate the connections of Figs. 10 to 13, reference will now be made to Figs. 14 and 15. Fig. 14 shows two coils $L_a$ and $L_b$ arranged coaxially, that is, one within the other. Fig. 15 shows two coils L and L' arranged in a manner similar to Figs. 7 to 9, that is, so that each of the coils has one surface in contiguous relation with the other. If the coils in each of the Figs. 14 and 15 are connected according to Fig. 12, the direction of the current in each coil will be as shown by the arrow heads drawn on the turns. Thus, for Fig. 14, the currents in adjacent turns of the two coils are in the same direction and the mutual inductance is in aiding sense. However, in Fig. 15, the currents in the adjacent turns of the two coils are in opposite directions and therefore the mutual inductance is in the bucking sense. Thus, we have seen that for the connections of Fig. 12 used in the arrangements of the subject invention, the designation is "parallel bucking." By similar reasoning we may designate the connections for Figs. 10 to 13, respectively, as series aiding, parallel aiding, parallel bucking and series bucking.

The coil-and-core structures of Figs. 7, 8 and 9 could be modified to provide further increase in tuning range by utilizing one or more of the following:

(1) Increase the ratio of length to diameter of the coils (the measured coils were only 1¼" long), (2) Make the cores somewhat longer than the coils (the cores and coils were both 1¼" long for the measurements), (3) Provide the core assembly with a connecting yoke as in Fig. 3 (the cores were entirely separate during the measurements on Figs. 7 to 9), (4) Ground the cores so as to increase the change in self-capacitance of the assembly as the cores are fully inserted (the cores were not grounded during the measurements), (5) Increase the permeability of the cores by using either powdered Permalloy or powdered molybdenum Permalloy (the cores used were standard powdered-iron cores of moderate permeability). Increasing the permeability would increase the self-inductance of each coil and also the mutual inductance between them, thus providing further increase in tuning range.

(6) Mold the coils in a thin shell of low-loss, high-dielectric-constant ceramic material such as one of the titanium dioxide compounds.

(7) Provide additional cores on each side of the assembly of Figs. 7 to 9 to thereby secure the further moderate improvement of Fig. 1.

One of the features mentioned above (6) for obtaining an increased tuning range is the use of a coil form of low-loss, high-dielectric-constant ceramic material with the coil embedded or molded therein. This may be embodied in a structure for a single coil-and-core assembly and may be applied equally as well to any of the dual coil assemblies herein disclosed. By making use of a considerably augmented change in the self-capacitance of a permeability tuning system, there is obtainable a tuning range which is much greater than that due to inductance change alone, resulting in a greatly improved L-C tuner.

Figure 16:
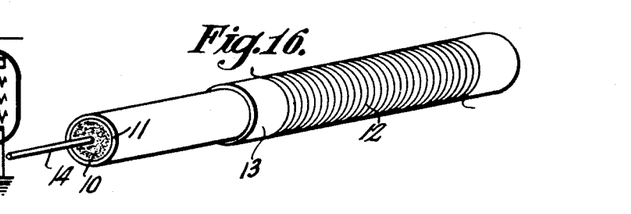
Fig. 16 discloses a permeability tuner according to the invention wherein there is obtained a simultaneous change in the inductance and self-capacitance of the tuner.

In Fig. 16 there is disclosed a powdered-iron core 10 coated with a layer 11 (of predetermined thickness) of low-loss, high-dielectric-constant material, such as one of the titanium type ceramics. The coil may be either wound on a thin-walled low-dielectric-constant coil-form 13 or the winding may be molded in a thin, low-dielectric-constant coil-form so that the inside diameter of the coil is practically the same as the outside diameter of the ceramic shell 11. This will insure the maximum change in both the inductance and the self-capacitance of the assembly, the greatest change in self-capacitance vs. core penetration occurring when the core stud is grounded.

Figure 17:
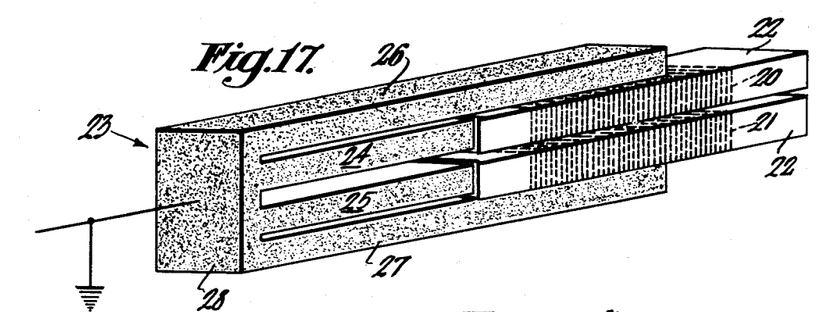
Fig. 17 discloses another preferred embodiment of a permeability tuner according to the invention.

In Fig. 17 there is illustrated an embodiment of the invention which utilizes the features above mentioned for still further increasing the tuning range. The two coils 20 and 21 are at least 1½" long and are molded or imbedded in a thin low-loss, high-dielectric-constant shell type coil-form 22. The coils are rectangular in shape and are constructed so that approximately 40% of the periphery of each coil is in uniformly contiguous relation with the other. The core assembly 23 is at least ½" longer than the coils, is made of molybdenum Permalloy powder, and is grounded. The core assembly comprises a pair of central cores 24 and 25 which are axially movable within their respective coils 20 and 21 and a pair of additional cores 26, 27 are placed on opposite sides of the outer faces of the dual coil assembly, thus resulting in a four core common assembly with a common yoke 28 joining the ends of the four cores. The coils are connected in "parallel aiding," and the circuit is tuned by a fairly low value of fixed circuit capacitance (30–50 $\mu\mu f$.) so as to realize the increase in tuning range due to the large change in self-capacitance of the assembly as the core structure is inserted in the coils. With the embodiment of Fig. 17 included in an iron-cored or permeability tuning system, it is entirely possible to achieve a frequency range of at least 20 to 1.

Figures 18, 19:
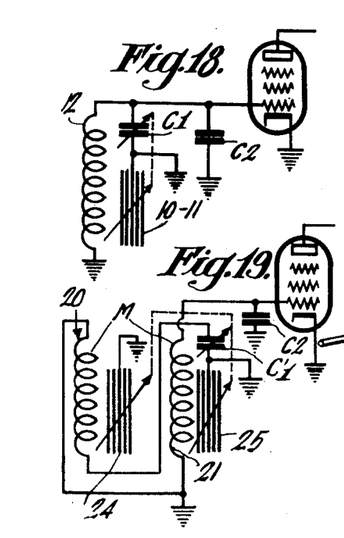
Fig. 18 is a circuit showing the connections for the tuner disclosed in Fig. 16.
Fig. 19 is a circuit diagram showing the connections for the tuner disclosed in Fig. 17.

The circuit connections for the tuner of Fig. 16 is shown schematically in Fig. 18. The capacitor $C_1$ represented diagrammatically as a variable capacitor, is the self-capacitance of the coil-and-core structure and is not an external capacitor. The additional fixed circuit capacity is represented as $C_2$. However for some purposes it may be possible to completely eliminate $C_2$. This it will be understood would result in the maximum possible tuning range.

Fig. 19 shows schematically the circuit connections for the tuner of Fig. 17, wherein a change in both inductance and capacity occurs as the cores 24 and 25 are inserted in their respective coils. The capacitor $C'_1$ represents the total self-capacitance of the entire assembly and may be measured between the high side of the circuit and ground. In this structure the inductance of coils 20, 21, the mutual M and $C'_1$ all increase as the cores are inserted in the structure. Again, $C_2$ may be eliminated in some applications.

Figure 20:
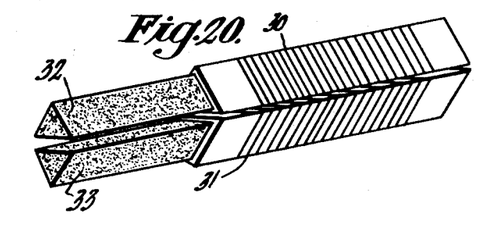
Fig. 20 is a still further embodiment of a permeability tuner according to the invention.

A still further embodiment of the invention is disclosed in Fig. 20 wherein are utilized triangular coils 30, 31 and cores 32, 33 pressed together in a dual assembly. For this case, from 33.3% to 41.5% of each coil perimeter is in contiguous relation with the other, depending upon whether the triangular units are equilateral or right-angled triangles.

While I have shown and described several embodiments of my invention, it will be understood that various modifications and changes will occur to those skilled in the art without departing from the spirit and scope of this invention. I therefore contemplate by the appended claims to cover any such modifications as fall within the true spirit and scope of my invention.

What I claim is:

1. A permeability tuning system comprising at least two coils of suitable geometric shape and so disposed that relatively large flat portions of their surfaces are in uniformly contiguous relation, and ferro-magnetic cores coated with a layer of high dielectric constant material, one core adapted for tuning each coil, axially movable therein in unison to effect a rate of change in mutual inductance several times greater than that of the self-inductances for varying the tuning of the system over a wide frequency range, because of a considerably augmented change in both capacitance and inductance.

2. A permeability tuning system comprising a pair of D-shaped coils disposed with their flat surfaces in contiguous relation, and similarly shaped ferro-magnetic cores, one for each coil, axially movable therein in unison to effect a rate of change in mutual inductance several times greater than that of the self-inductances for varying the tuning of the system.

3. A permeability tuning system comprising a pair of triangularly-shaped coils disposed so that one of the flat surfaces of each are in contiguous relation, and similarly shaped ferro-magnetic cores, one for each coil, axially movable therein in unison to effect substantially the same rate of change in mutual inductance as in the self-inductances over a substantial portion of the tuning range.

4. A permeability tuning system comprising at least two coils of suitable geometric shape and each having a flat surface, said coils being disposed so that their flat surfaces are in contiguous relation, and ferro-magnetic cores, one for each coil, axially movable therein in unison to effect a rate of change in mutual inductance several times greater than that of the self-inductances for varying the tuning of the system over a wide frequency range, the rates of change in mutual and self-inductances being so related that over a substantial portion of the frequency range the percent coupling remains substantially constant.

5. A permeability tuning system comprising at least two coils electrically connected in series aiding relation and of suitable geometric shape so disposed that at least 10 percent of their surfaces are in uniformly contiguous relation, and ferro-magnetic cores, one for each coil, axially movable therein in unison to effect substantially the same rate of change in mutual inductance as in the self-inductances over a substantial portion of the tuning range.

6. A permeability tuning system comprising at least two coils electrically connected in parallel aiding relation and of suitable geometric shape so disposed that at least 10 percent of their surfaces are in contiguous relation, and ferro-magnetic cores, one for each coil, axially movable therein for varying the tuning of the system.

7. A permeability tuning system comprising a coil of the solenoid type and D-shaped in cross-section, and a pair of similarly-shaped magnetic cores disposed with their flat surfaces in adjacent relation, one of said cores being movable within the coil and the other core being movable in unison with the first core and disposed externally of the coil.

WILLIAM F. SANDS.

REFERENCES CITED

The following references are of record in the file of this patent:

UNITED STATES PATENTS

| Number | Name | Date |
|---|---|---|
| 1,639,662 | Osborne | Aug. 23, 1927 |
| 1,647,736 | Kollath | Nov. 1, 1927 |
| 1,661,953 | McIntosh | Mar. 6, 1928 |
| 1,704,215 | Roos | Mar. 5, 1929 |
| 1,978,600 | Polydoroff | Oct. 30, 1934 |
| 2,095,420 | Polydoroff | Oct. 12, 1937 |
| 2,213,328 | Schaper | Sept. 3, 1940 |
| 2,276,617 | Kreienfeld | Mar. 17, 1942 |